（12) United States Patent
Maier et al.

(10) Patent No.: US 10,359,737 B2
(45) Date of Patent: Jul. 23, 2019

(54) FLEXIBLE-PIVOT MECHANICAL COMPONENT AND TIMEKEEPING DEVICE INCLUDING SAME

(71) Applicant: PATEK PHILIPPE SA GENEVE, Genève (CH)

(72) Inventors: Frédéric Maier, Neuchâtel (CH); David Chabloz, Sallanches (FR)

(73) Assignee: PATEK PHILIPPE SA GENEVE, Geneva (CH)

( * ) Notice: Subject to any disclaimer, the term of this patent is extended or adjusted under 35 U.S.C. 154(b) by 0 days.

(21) Appl. No.: 15/764,282

(22) PCT Filed: Sep. 26, 2016

(86) PCT No.: PCT/IB2016/055733
§ 371 (c)(1),
(2) Date: Mar. 28, 2018

(87) PCT Pub. No.: WO2017/055983
PCT Pub. Date: Apr. 6, 2017

(65) Prior Publication Data
US 2018/0284695 A1    Oct. 4, 2018

(30) Foreign Application Priority Data
Sep. 29, 2015    (EP) .................................... 15187246

(51) Int. Cl.
G04B 17/04    (2006.01)
G04B 13/02    (2006.01)
(Continued)

(52) U.S. Cl.
CPC ......... *G04B 17/045* (2013.01); *G04B 13/022* (2013.01); *G04B 18/006* (2013.01);
(Continued)

(58) Field of Classification Search
CPC ........ G04B 17/04; G04B 13/02; G04B 18/00; G04B 17/045; G04B 13/022;
(Continued)

(56) References Cited

U.S. PATENT DOCUMENTS 2,793,028 A * 5/1957 Wheeler ................. F16C 11/12
16/227
2,920,498 A * 1/1960 Federn ..................... F16C 7/04
403/231

(Continued)

FOREIGN PATENT DOCUMENTS

DE    201823 C    9/1908
EP    2887151 A2    6/2015
(Continued)

OTHER PUBLICATIONS

International Search Report, dated Dec. 13, 2016, from corresponding PCT application No. PCT/IB2016/055733.

*Primary Examiner* — Sean P Kayes
(74) *Attorney, Agent, or Firm* — Young & Thompson

(57) ABSTRACT

Disclosed is a flexible-pivot mechanical component of the type with separate intersecting blades, particularly for timepieces. The mechanical component includes an attachment portion and a movable portion that are connected by first and second resilient blades that intersect in a contactless manner at an intersecting point. The flexible-pivot mechanical component is combined with an adjustment unit making it possible to adjust the position of the intersecting point.

27 Claims, 9 Drawing Sheets

(51) Int. Cl.
    *G04B 18/00*     (2006.01)
    *G04B 18/04*     (2006.01)
    *G04B 31/00*     (2006.01)
    *F16C 11/12*     (2006.01)

(52) U.S. Cl.
    CPC ............ *G04B 18/04* (2013.01); *G04B 31/00* (2013.01); *F16C 11/12* (2013.01); *F16C 2370/00* (2013.01)

(58) Field of Classification Search
    CPC ...... G04B 18/006; G04B 18/04; G04B 31/00; F16C 11/12; F16C 2370/00
    See application file for complete search history.

(56) References Cited

U.S. PATENT DOCUMENTS

| | | | |
|---|---|---|---|
| 3,465,997 A | | 9/1969 | Piske |
| 3,520,127 A | | 7/1970 | Meyer |
| 3,605,176 A | | 9/1971 | Jones |
| 4,497,465 A | | 2/1985 | Yeakley et al. |
| 5,061,107 A | * | 10/1991 | Brooks ................... F16C 11/12 403/24 |
| 9,477,205 B2 | * | 10/2016 | Born ...................... G04B 17/04 |
| 2016/0179058 A1 | * | 6/2016 | Born ...................... G04B 17/04 368/167 |

FOREIGN PATENT DOCUMENTS

| | | |
|---|---|---|
| EP | 2911012 A1 | 8/2015 |
| WO | 84/03823 A1 | 10/1984 |

\* cited by examiner

FLEXIBLE-PIVOT MECHANICAL COMPONENT AND TIMEKEEPING DEVICE INCLUDING SAME

The present invention relates to a flexible pivot mechanical component in particular for timepieces.

Flexible pivot mechanical components are designed to pivot without a physical rotation axle, thus without friction, about a virtual rotation axis, by virtue of an arrangement of elastic parts.

Different types of flexible pivots exist, such as pivots with separate crossed strips, pivots with non-separate crossed strips or pivots with a remote centre of rotation, named "RCC" (Remote Centre Compliance).

The present invention relates to the first type of flexible pivots, i.e. pivots with separate crossed strips. These pivots are known for their low stiffness which allows them to be used in parts of a timepiece movement where little energy is available. Examples of such pivots are described in patents U.S. Pat. No. 3,520,127 and DE 201 823 and in patent application EP 2 911 012.

A pivot with separate crossed strips comprises two elastic strips which connect a fixing part of the component to a movable part of the component and which cross, without contact, at a crossing point.

The position of the crossing point of the strips is important because it influences the precision of the operation of the component. However, current manufacturing techniques, even the most precise ones, do not make it possible to ensure optimal positioning of this point.

The present invention aims to overcome this problem, at least partially, and to this end proposes a timepiece device comprising a flexible pivot mechanical component of the type with separate crossed strips comprising a fixing part and a movable part which are connected by first and second elastic strips crossing without contact at a crossing point, said timepiece device being characterised in that it comprises adjusting means for adjusting the position of the crossing point.

Typically, at least one of the fixing part and the movable part comprises a first part and a second part which can move with respect to each other, and the adjusting means are arranged to adjust the position of the crossing point by adjusting the relative position of these first and second parts.

The first and second parts can be movable with respect to each other in translation or, alternatively, in rotation.

The flexible pivot mechanical component can comprise connecting means elastically connecting the first and second parts.

These connecting means are preferably arranged to permit a relative displacement of the first and second parts only in a specific direction, in translation or in rotation.

In particular applications, the flexible pivot mechanical component is, or comprises, an oscillator, a lever, a rocker or an escapement anchor.

The flexible pivot mechanical component is preferably monolithic.

The adjusting means can comprise an adjusting eccentric or a micrometric adjusting screw, for example.

Alternatively, the adjusting means can comprise a set of calibrated pieces, the position of the crossing point being adjusted by mounting at least one of these pieces on the flexible pivot mechanical component.

The present invention also proposes a flexible pivot mechanical timepiece component of the type with separate crossed strips, comprising a fixing part and a movable part connected by first and second elastic strips crossing without contact at a crossing point, characterised in that at least one of the fixing part and the movable part comprises a first part and second part which can move with respect to each other and which are respectively connected to the other of the fixing part and the movable part by the first and second elastic strips, and in that the position of the crossing point can be adjusted by adjusting the relative position of these first and second parts.

The present invention also proposes a flexible pivot mechanical component of the type with separate crossed strips, in particular for timepieces, comprising a fixing part and a movable part which are connected by first and second elastic strips crossing without contact at a crossing point, said component being monolithic and characterised in that the position of the crossing point is adjustable.

The present invention also proposes a timepiece movement comprising a timepiece device or flexible pivot mechanical component as defined above.

Finally, the present invention proposes a method for assembling such a timepiece movement, characterised in that the flexible pivot mechanical component is, or comprises, an oscillator, and in that the method comprises a step consisting of adjusting the position of the crossing point on the basis of isochronism measurements.

Other features and advantages of the present invention will become clear upon reading the following detailed description given with reference to the attached drawings in which.

Figure 1:
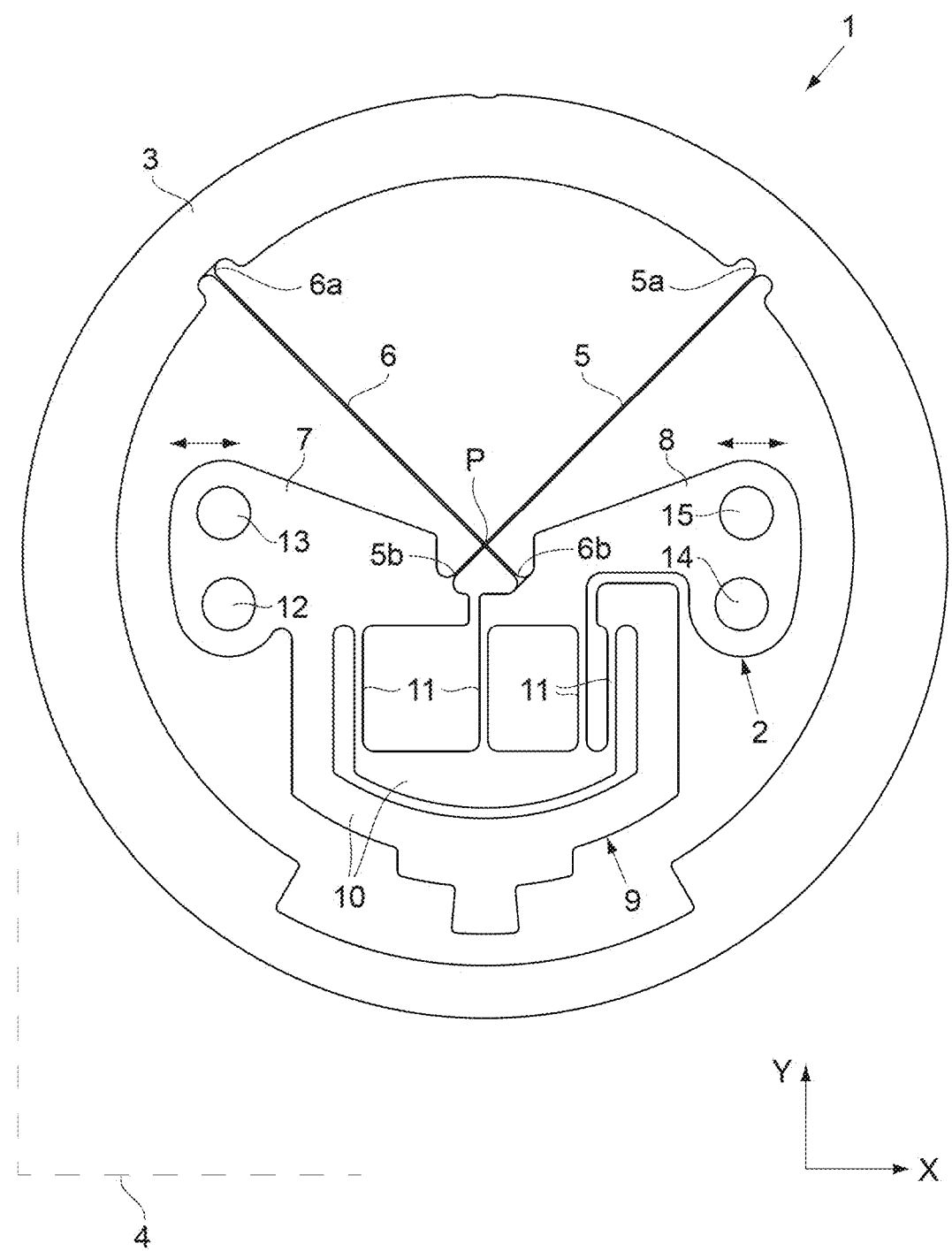
FIGS. 1 and 2 are respectively a planar view from above and a perspective view of a flexible pivot mechanical oscillator according to a first embodiment of the invention.
Figure 2:
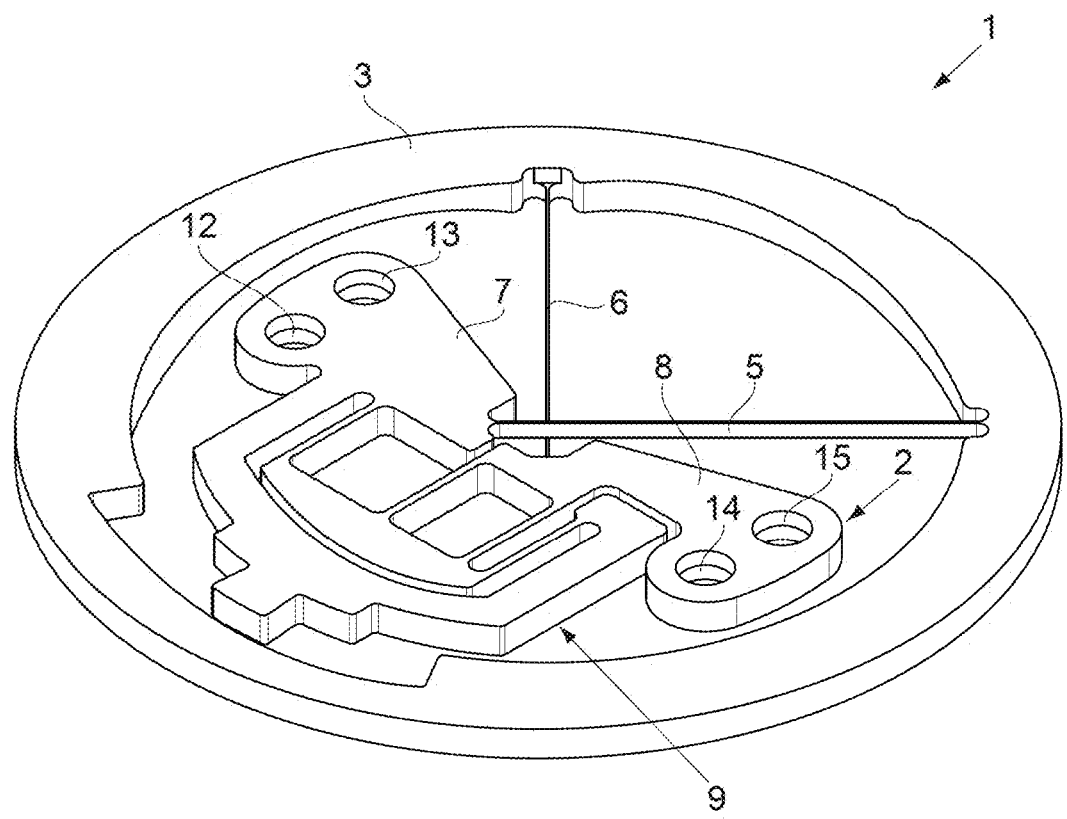

With reference to FIGS. 1 and 2, a flexible pivot mechanical oscillator 1 according to a first embodiment of the invention comprises a fixing part 2 and a movable part 3 which surrounds the fixing part 2. The fixing part 2 serves to mount the oscillator 1 on a fixed or movable support 4 such as a plate or a member of the escapement, e.g. an anchor, of a timepiece movement. In operation, the movable part 3 oscillates with respect to the fixing part 2 and thus acts as a balance. The fixing part 2 and the movable part 3 are connected by first and second elastic strips 5, 6 of the same length which cross without contact, extending in two different parallel planes. In a plan view from above, these elastic strips 5, 6 cross at a point P which constitutes the centre of rotation of the movable part 3 with respect to the fixing part 2. More precisely, the straight line forming the intersection of the surfaces passing through the neutral fibres of the elastic strips 5, 6 and perpendicular to the plane of the oscillator 1 (plane of FIG. 1) constitutes the axis of rotation of the movable part 3 with respect to the fixing part 2. The elastic strips 5, 6 exert a restoring force on the movable part 3 with respect to the fixing part 2 in the manner of the balance spring of a balance-balance spring oscillator. The oscillator 1 is associated with an escapement (not illustrated) which can be of a conventional type such as a Swiss lever escapement or any other type.

The fixing part 2 is itself in two parts, i.e. a first part 7 and a second part 8. The first elastic strip 5 is joined by a first end 5a to the movable part 3 and by its second end 5b to the first part 7. The second elastic strip 6 is joined by a first end 6a to the movable part 3 and by its second end 6b to the second part 8. A connecting member 9 elastically connects the first and second parts 7, 8. The connecting member 9 is composed of rigid parts 10 and elastic parts 11 which are arranged to permit a relative displacement of the first and second parts 7, 8 only in translation on an axis X, parasitic displacements in translation in the other directions or in rotation being prevented. This pure translation on the axis X of the first and second parts 7, 8 leads to a translation which is pure, and thus easily governable, of the movable part 3 on an axis Y perpendicular to the axis X. However, in variations, the connecting member 9 could be omitted and the first and second parts 7, 8 could be free with respect to each other. The first part 7 of the fixing part 2 has two holes 12, 13. The second part 8 of the fixing part 2 has two holes 14, 15. The holes 12, 14 permit the oscillator 1 to be manipulated by a tool such as tweezers. The holes 13, 15 are intended to receive pins to fix the oscillator 1 to the fixed or movable support 4. The relative movability in translation on the axis X of the first and second parts 7, 8 makes it possible to adjust the spacing between these parts during assembly of the timepiece movement in order to adjust the position of the crossing point P of the elastic strips 5, 6.

Indeed, the crossing point P of the elastic strips 5, 6 is at a position which depends on the relative position of the first and second parts 7, 8. The closer the first and second parts 7, 8 are to each other, the closer the crossing point P is to the ends 5b, 6b of the elastic strips 5, 6. Conversely, the further apart the first and second parts 7, 8 are, the closer the crossing point P is to the ends 5a, 6a of the elastic strips 5, 6. According to the theory developed by W. H. Wittrick, the optimal position of the crossing point P for minimising parasitic displacements of the centre of rotation of the movable part is located at about 12.7% ($\frac{1}{2}-\sqrt{5}/6$) of the length of each elastic strip. The present invention can be used to achieve such a position for the crossing point P. However, the present applicant has discovered that it was possible to improve the operation of the oscillator still further by adjusting the position of the crossing point P by choosing a position for the crossing point P which optimises the isochronism of the oscillator.

Figure 3:
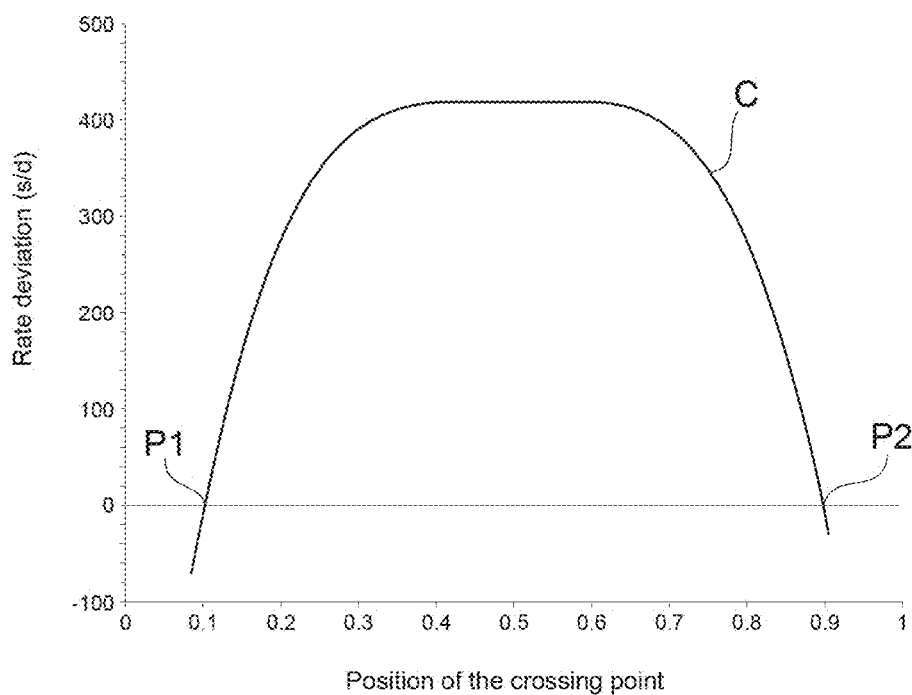
FIG. 3 shows a rate deviation curve of the flexible pivot mechanical oscillator in accordance with the invention in dependence upon the position of a crossing point of elastic strips forming the flexible pivot.

The isochronism of an oscillator such as that illustrated in FIGS. 1 and 2 depends on a number of parameters, i.e. in particular the parasitic displacements of the centre of rotation P, the variation in the stiffness of the flexible pivot (elastic strips 5, 6) depending on the angle of rotation, the disturbances caused by the escapement, and gravity. FIG. 3 shows a curve C illustrating the rate deviation in seconds/day of the oscillator 1 between an oscillation amplitude of 20° and an oscillation amplitude of 2° depending on the ratio of the distance between the crossing point P and the end 5b, 6b of each elastic strip 5, 6 to the length of each elastic strip 5, 6. The curve C is obtained by numerical simulation and takes into account the parasitic displacements of the centre of rotation P and the variation in the stiffness of the flexible pivot depending on the angle of rotation. As shown, there are two points P1, P2 on the curve C where the rate deviation is zero, i.e. where isochronism is optimal. In the illustrated example, these points P1, P2 are respectively at 10% and 90% of the length of the elastic strips 5, 6. FIG. 3 also shows that the slope of the curve C is steep around the points P1, P2. Because of manufacturing tolerances, this steep slope of the curve C makes it necessary to adjust the position of the crossing point P along each elastic strip 5, 6 to obtain a desired isochronism.

Figure 4:
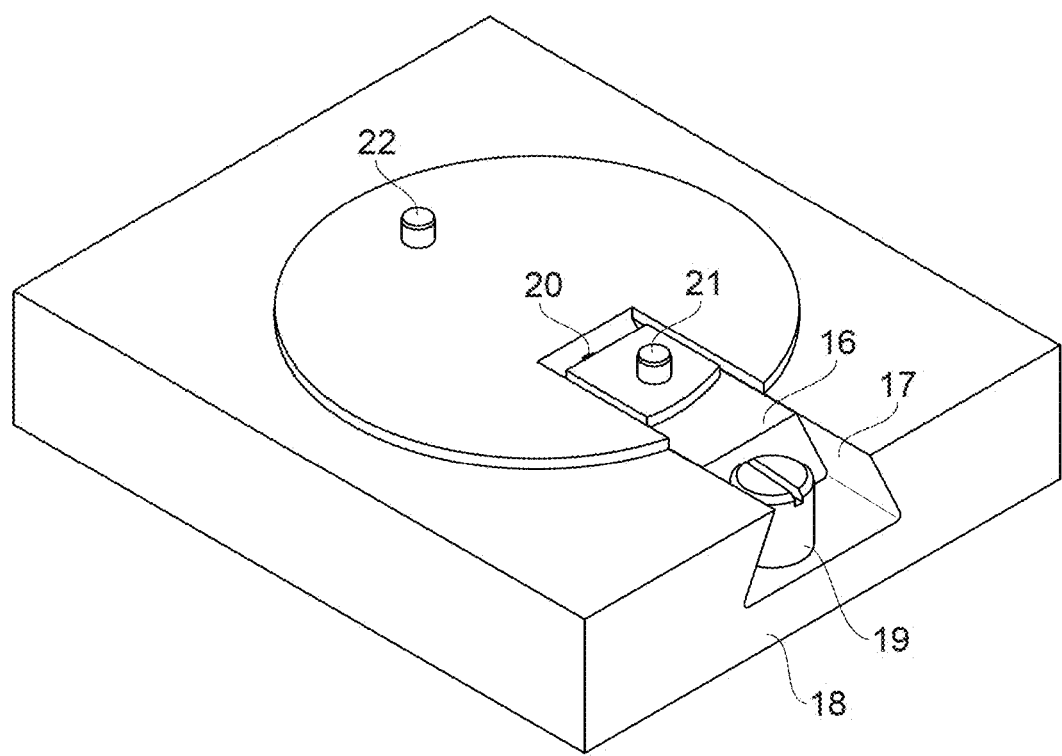
FIG. 4 is a perspective view of an example of an adjusting device associated with the flexible pivot mechanical oscillator in accordance with the first embodiment of the invention.

In practice, each of the first and second parts 7, 8 of the fixing part 2, or only one of these parts, can be mounted on an adjusting device which is itself mounted on the support 4. The or each adjusting device is e.g. an adjusting device with an eccentric, or with a micrometric screw, associated with a slide block or a flexible linear guidance system. An example of such an adjusting device is illustrated in FIG. 4. It comprises a slide block 16 guided in a groove 17 of a support 18 fixed to the fixed or movable support 4 or forming part thereof. The position of the slide block 16 in the groove 17 can be adjusted by an eccentric 19. A restoring spring 20 keeps the slide block 16 in abutment against the eccentric 19. The slide block 16 has a pin 21 engaged in the hole 15 of the second part 8 of the fixing part 2. The support 18 has another pin 22 engaged in the hole 13 of the first part 7 of the fixing part 2. However, numerous variations are possible.

In the present invention, the watchmaker can thus adjust the spacing of the first and second parts 7, 8 of the fixing part 2 and thus the position of the crossing point P during assembly of the movement, on the basis of isochronism measurements taking into account all the parameters mentioned above, i.e. the parasitic displacements of the centre of rotation P, the variation in the stiffness of the flexible pivot (elastic strips 5, 6) depending on the angle of rotation, the disturbances caused by the escapement, and gravity (causing rate deviations between the different positions of the movement). Such adjustment makes it possible to optimise the isochronism of the oscillator 1. Adjusting the position of the crossing point P prestresses (flexes) the elastic strips 5, 6. This prestressing does not impair the operation of the oscillator.

Figure 5:
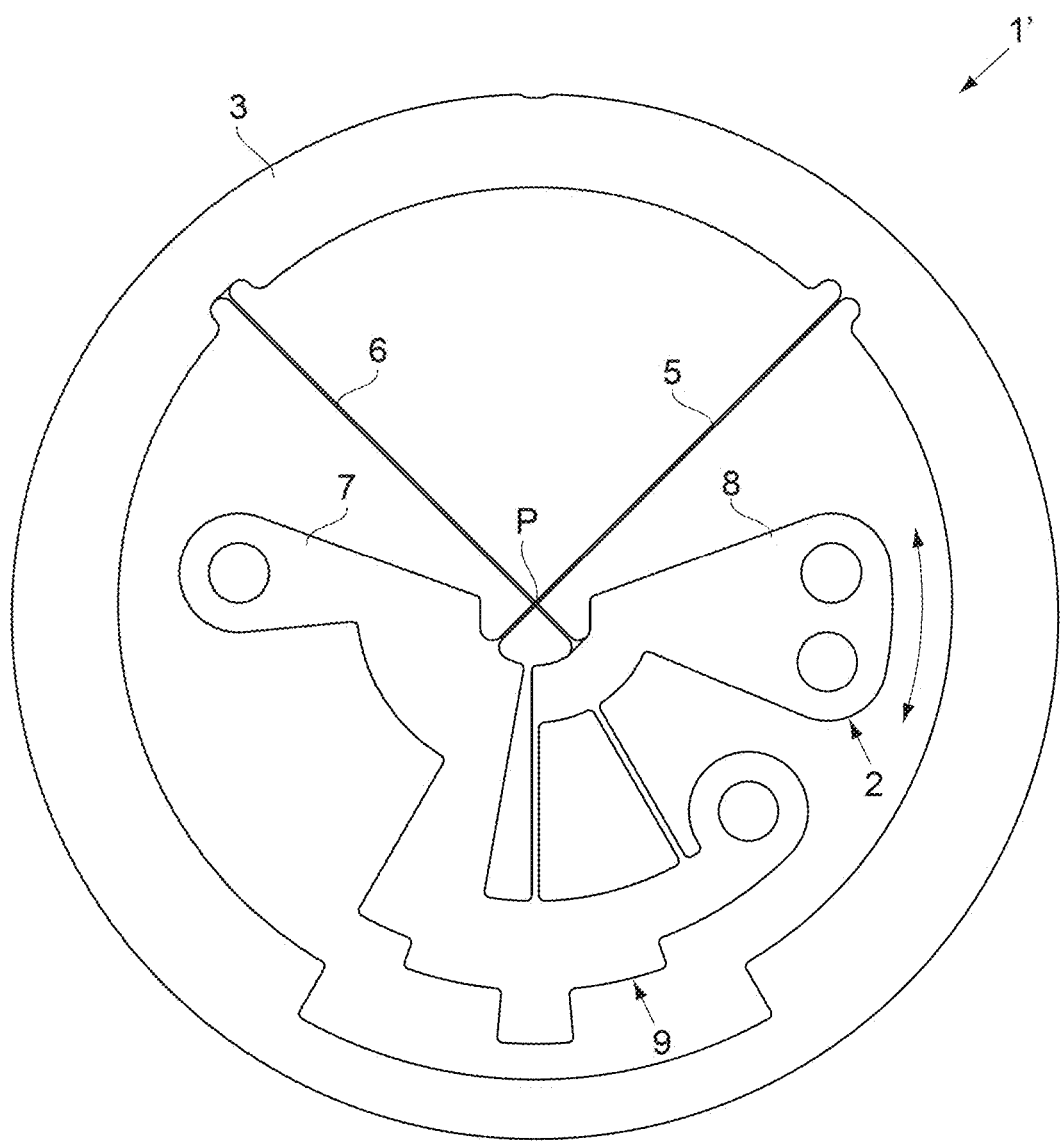
FIGS. 5 and 6 are respectively a planar view from above and a perspective view of a flexible pivot mechanical oscillator according to a second embodiment of the invention.
Figure 6:
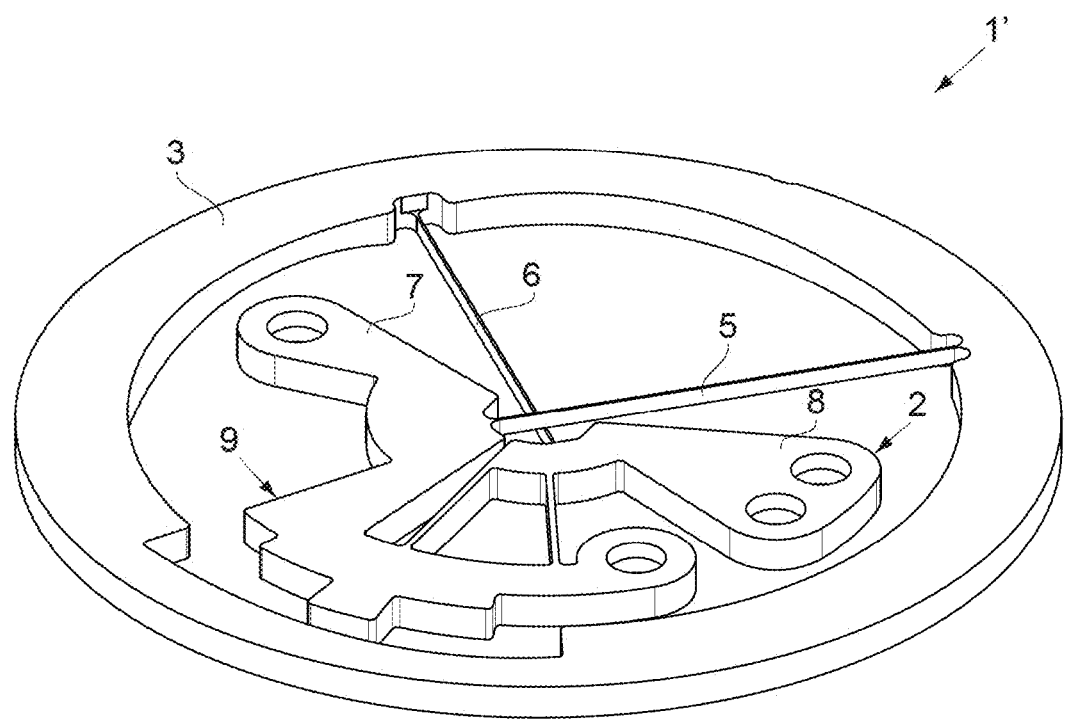

FIGS. 5 and 6 show a flexible pivot mechanical oscillator 1' in accordance with a second embodiment of the invention. This oscillator 1' differs from the oscillator 1 of FIGS. 1 and 2 in the shape of the connecting member 9 elastically connecting the first and second parts 7, 8 of the fixing part 2. Here, indeed, the connecting member 9 is arranged to permit a relative displacement between the first and second parts 7, 8 only in rotation, e.g. about the crossing point P of the elastic strips 5, 6 at rest. Such a relative displacement in rotation also makes it possible to adjust the position of the point P. The oscillator 1' can be associated with an adjusting device of the same type as that associated with the oscillator 1 but with rotational guidance.

Figure 7:
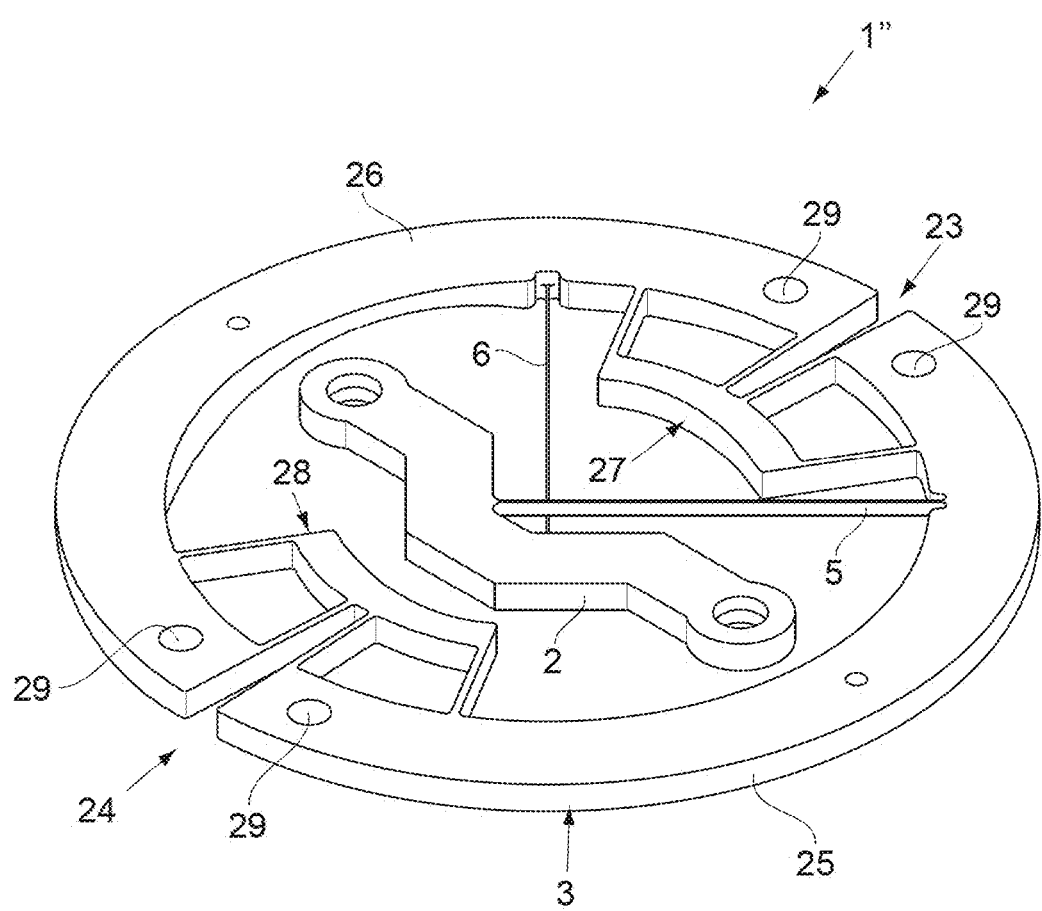
FIG. 7 is a perspective view of a flexible pivot mechanical oscillator in accordance with a third embodiment of the invention.
Figure 8:
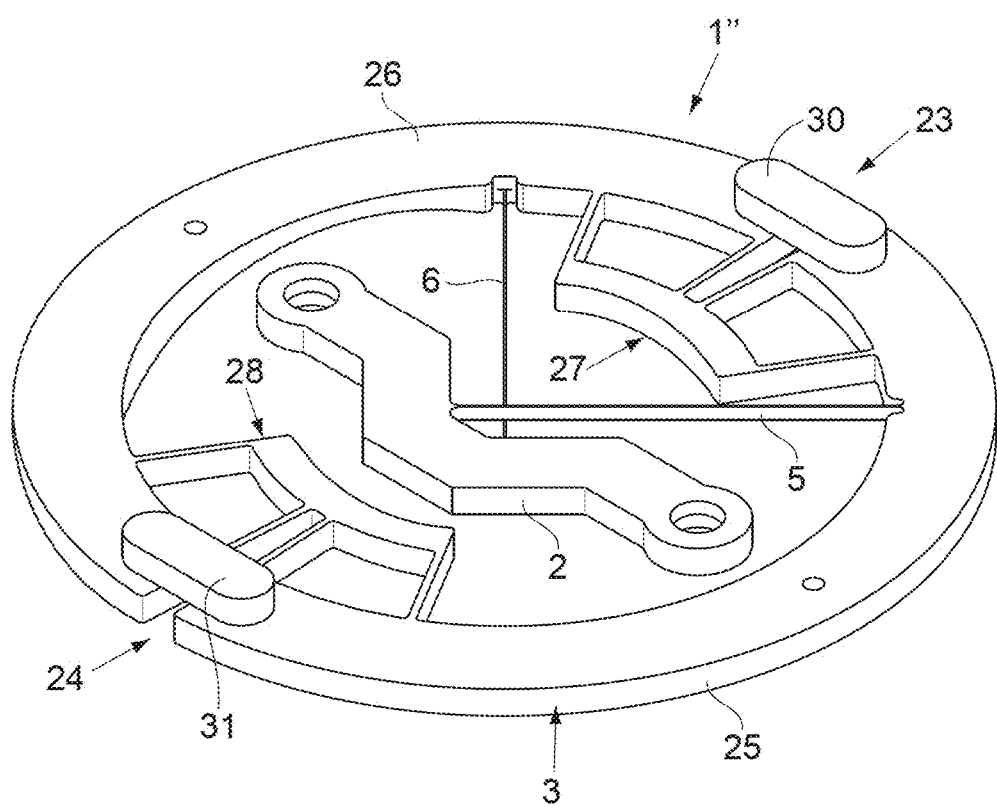
FIG. 8 is a perspective view of the flexible pivot mechanical oscillator in accordance with the third embodiment, fitted with adjusting means.

FIG. 7 shows a flexible pivot mechanical oscillator 1" in accordance with a third embodiment of the invention. In this third embodiment, it is the movable part 3 which is in two parts elastically connected to each other. More precisely, the movable part 3 is in the form of a ring which is interrupted in two diametrically opposite zones 23, 24 to define two arcs 25, 26. These two arcs 25, 26 are connected in the zones 23, 24 by two connecting members 27, 28. The connecting members 27, 28 are arranged to permit a relative displacement of the arcs 25, 26 only in rotation, e.g. about the crossing point of the elastic strips 5, 6 at rest. Each arc 25, 26 has a hole 29 at each of its ends. These holes 29 can receive studs (not shown in the figures) of two adjusting pieces 30, 31 (cf. FIG. 8) connecting the arcs 25, 26 in the zones 23, 24 respectively. The adjusting pieces 30, 31 are calibrated and chosen from among a set of adjusting pieces having different stud spacings in order to maintain a desired relative position of the arcs 25, 26 against an elastic restoring force exerted by the connecting members 27, 28. The adjusting pieces 30, 31 thus permit incremental adjustment of the position of the crossing point of the elastic strips 5, 6.

Figure 9:
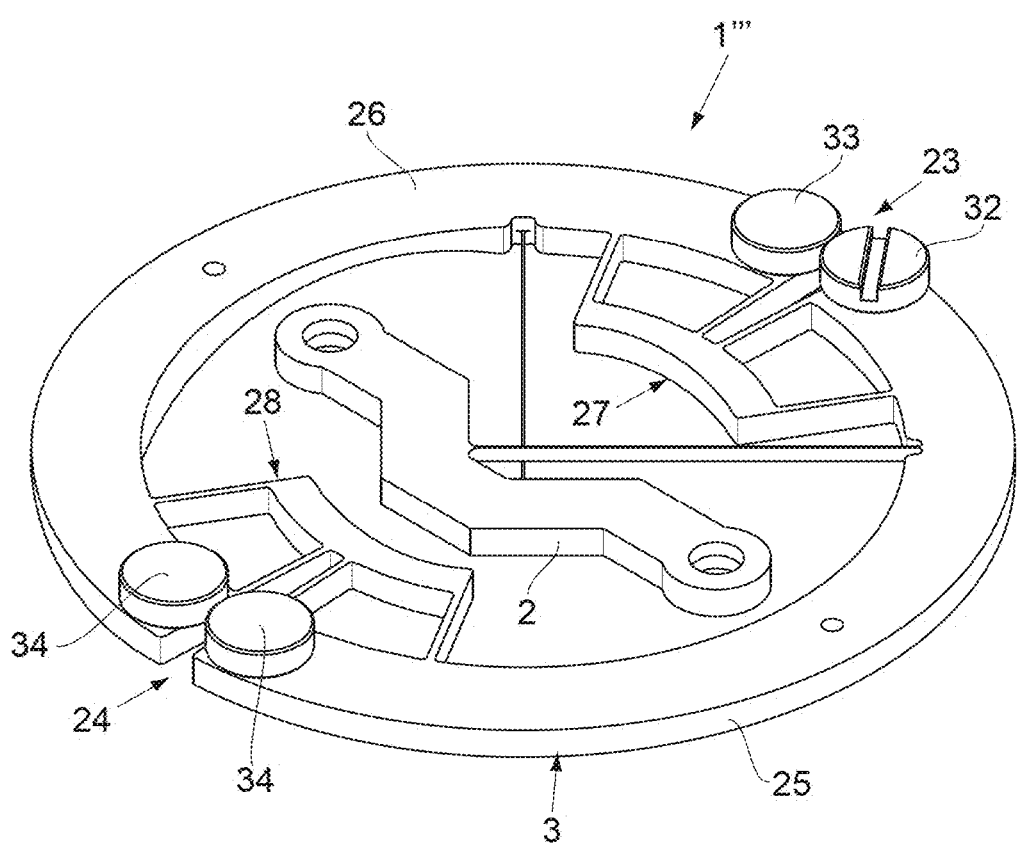
FIG. 9 is a perspective view of a flexible pivot mechanical oscillator in accordance with a fourth embodiment of the invention, fitted with adjusting means.

FIG. 9 shows a flexible pivot mechanical oscillator 1''' in accordance with a fourth embodiment of the invention. In this fourth embodiment, the relative position of the two arcs 25, 26 of the movable part 3, thus the position of the crossing point of the elastic strips 5, 6, can be adjusted using an eccentric 32 borne by one of the arcs 25, 26 and maintained in abutment against a stud 33 on the other arc in the zone 23. The maintenance of the contact between the eccentric 32 and the stud 33 is ensured by the connecting members 27, 28 acting on the arcs 25, 26. In the zone 24 diametrically opposite the zone 23, the arcs 25, 26 have studs 34 serving to balance the balance formed by the movable part 3.

Each of the first and second embodiments could be combined with one of the third and fourth embodiments. Thus in the present invention, the crossing point P of the elastic strips 5, 6 could be adjusted by adjusting the relative position of the two parts 7, 8 of the fixing part 2 and the relative position of the two parts 25, 26 of the movable part 3.

The oscillator in accordance with the invention can be produced monolithically, e.g. of silicon or any other suitable material according to the deep reactive ion etching (DRIE) technique, of nickel, nickel alloy or any other suitable material according to the lithography, electroplating and moulding (LIGA) technique, of steel, copper-beryllium, nickel-silver or another metal alloy by milling or spark-machining, or of metallic glass by moulding.

Such monolithic production is particularly suitable for oscillators intended to operate at high frequencies. For lower operating frequencies, it is possible to attach inertial pieces, such as a felloe and/or inertia blocks, to the monolithically formed oscillator, these pieces being made of a denser material than that of the oscillator, as described in patent application EP 2 911 012.

The elastic strips 5, 6 as illustrated in the drawings are straight when at rest (state where the position of the crossing point P has not yet been adjusted) but they could, alternatively, be curved.

The oscillator in accordance with the invention can comprise more than two elastic strips. For example, it could comprise a second pair of elastic strips superimposed to the first pair of elastic strips 5, 6 and of which the two strips would cross without contact at the crossing point P, in order to increase the stiffness of the flexible pivot outside the plane of the oscillator.

The present invention could be applied to mechanical components other than an oscillator, e.g. to an escapement anchor, a lever or a rocker, in order to increase the operating precision thereof, to adjust the position of the centre of rotation or to adjust the position of the movable part.

The invention claimed is:

1. Timepiece device comprising a flexible pivot mechanical component (1; 1'; 1''; 1''') of the type with separate crossed strips, said component comprising a fixing part (2) and a movable part (3) which are connected by first and second elastic strips (5, 6) crossing without contact at a crossing point (P), said timepiece comprising adjusting means (16-21; 30, 31; 32) for adjusting the position of the crossing point (P).

2. Timepiece device as claimed in claim 1, wherein at least one of the fixing part (2) and the movable part (3) comprises a first part (7; 25) and a second part (8; 26) which can move with respect to each other, and in that the adjusting means (16-21, 30, 31; 32) are arranged to adjust the position of the crossing point (P) by adjusting the relative position of these first and second parts (7, 8; 25, 26).

3. Timepiece device as claimed in claim 2, wherein the first and second parts (7, 8; 25, 26) can move with respect to each other in translation.

4. Timepiece device as claimed in claim 2, wherein the first and second parts (7, 8; 25, 26) can move with respect to each other in rotation.

5. Timepiece device as claimed in claim 2, comprising connecting means (9; 27, 28) elastically connecting the first and second parts (7, 8; 25, 26).

6. Timepiece device as claimed in claim 5, wherein the connecting means (9; 27, 28) are arranged to permit a relative displacement of the first and second parts (7, 8; 25, 26) only in a specific direction.

7. Timepiece device as claimed in claim 1, wherein the flexible pivot mechanical component is, or comprises, an oscillator (1; 1'; 1''; 1''').

8. Timepiece device as claimed in claim 1, wherein the flexible pivot mechanical component is, or comprises, a lever, a rocker or an escapement anchor.

9. Timepiece device as claimed in claim 1, wherein the flexible pivot mechanical component is monolithic.

10. Timepiece device as claimed in claim 1, wherein the adjusting means (16-21; 32) comprise an adjusting eccentric (19; 32) or a micrometric adjusting screw.

11. Timepiece device as claimed in claim 1, wherein the adjusting means comprise a set of calibrated pieces, the position of the crossing point (P) being adjusted by mounting at least one (30, 31) of these pieces on the flexible pivot mechanical component.

12. Timepiece movement comprising a timepiece device as claimed in claim 1.

13. Method for assembling a timepiece movement as claimed in claim 12, wherein said component is, or comprises, an oscillator, and wherein the method comprises a step consisting of adjusting the position of the crossing point (P) on the basis of isochronism measurements.

14. Flexible pivot mechanical timepiece component of the type with separate crossed strips, comprising a fixing part (2) and a movable part (3) which are connected by first and second elastic strips (5, 6) crossing without contact at a crossing point (P), wherein at least one of the fixing part (2) and the movable part (3) comprises a first part (7; 25) and second part (8; 26) which can move with respect to each other, and wherein the position of the crossing point (P) can be adjusted by adjusting the relative position of these first and second parts (7, 8; 25, 26).

15. Flexible pivot mechanical timepiece component as claimed in claim 14, wherein the first and second parts (7, 8; 25, 26) can move with respect to each other in translation.

16. Flexible pivot mechanical timepiece component as claimed in claim 14, wherein the first and second parts (7, 8; 25, 26) can move with respect to each other in rotation.

17. Flexible pivot mechanical timepiece component as claimed in claim 14, further comprising connecting means (9; 27, 28) elastically connecting the first and second parts (7, 8; 25, 26).

18. Flexible pivot mechanical timepiece component as claimed in claim 17, wherein the connecting means (9; 27, 28) are arranged to permit a relative displacement of the first and second parts (7, 8; 25, 26) only in a specific direction.

19. Flexible pivot mechanical timepiece component as claimed in claim 14, wherein it is, or comprises, an oscillator (1; 1'; 1"; 1'''), a lever, a rocker or an escapement anchor.

20. Flexible pivot mechanical timepiece component as claimed in claim 14, wherein it is monolithic.

21. Flexible pivot mechanical component of the type with separate crossed strips, comprising a fixing part (2) and a movable part (3) which are connected by first and second elastic strips (5, 6) crossing without contact at a crossing point (P), said component being monolithic and wherein the position of the crossing point (P) is adjustable.

22. Flexible pivot mechanical component as claimed in claim 21, wherein at least one of the fixing part (2) and the movable part (3) comprises a first part (7; 25) and a second part (8; 26) which can move with respect to each other, and wherein the position of the crossing point (P) can be adjusted by adjusting the relative position of these first and second parts (7, 8; 25, 26).

23. Flexible pivot mechanical component as claimed in claim 22, wherein the first and second parts (7, 8; 25, 26) can move with respect to each other in translation.

24. Flexible pivot mechanical component as claimed in claim 22, wherein the first and second parts (7, 8; 25, 26) can move with respect to each other in rotation.

25. Flexible pivot mechanical component as claimed in claim 22, further comprising connecting means (9; 27, 28) elastically connecting the first and second parts (7, 8; 25, 26).

26. Flexible pivot mechanical component as claimed in claim 25, wherein the connecting means (9; 27, 28) are arranged to permit a relative displacement of the first and second parts (7, 8; 25, 26) only in a specific direction.

27. Flexible pivot mechanical component as claimed in claim 21, wherein it is, or comprises, an oscillator (1; 1'; 1"; 1'''), a lever, a rocker or an escapement anchor.

\* \* \* \* \*